United States Patent
Fries et al.

(10) Patent No.: US 6,303,730 B1
(45) Date of Patent: Oct. 16, 2001

(54) ORGANIC/INORGANIC COMPOSITES WITH LOW HYDROXYL GROUP CONTENT, METHOD FOR THEIR PRODUCTION AND APPLICATION

(75) Inventors: Kira Fries, Neunkirchen; Martin Mennig, Quierschied; Helmut Schmidt, Saarbruecken-Guedingen; Ulrich Sohling, Freising; Qiwu Xing, Homburg; Michael Zahnhausen, Saarbruecken, all of (DE)

(73) Assignee: Institut fur Neue Materialien gemeinnutzige GmbH, Saarbrucken (DE)

( * ) Notice: Subject to any disclaimer, the term of this patent is extended or adjusted under 35 U.S.C. 154(b) by 0 days.

(21) Appl. No.: 09/367,884

(22) PCT Filed: Feb. 19, 1998

(86) PCT No.: PCT/EP98/00910

§ 371 Date: Aug. 19, 1999

§ 102(e) Date: Aug. 19, 1999

(87) PCT Pub. No.: WO98/37127

PCT Pub. Date: Aug. 27, 1998

(30) Foreign Application Priority Data

Feb. 19, 1997 (DE) .............................................. 197 06 515

(51) Int. Cl.$^7$ .......................... C08G 77/06; C08G 77/18; C08G 77/24
(52) U.S. Cl. .............................. 528/32; 528/42; 528/39; 524/789; 524/780; 524/783; 524/784; 524/786; 524/788; 523/213

(58) Field of Search .................................. 528/32, 39, 42; 524/789, 780, 783, 784, 786, 788; 523/213

(56) References Cited

U.S. PATENT DOCUMENTS

| | | | |
|---|---|---|---|
| 4,036,933 | * | 7/1977 | Laufer et al. . |
| 4,979,973 | * | 12/1990 | Takita et al. . |
| 5,401,528 | * | 3/1995 | Schmidt . |
| 5,668,237 | * | 9/1997 | Popall et al. . |

OTHER PUBLICATIONS

Hay et al., A Versatile Route to Organically–Modified Silicas and Porous Silicas via the Non–hydrolyticl Sol–Gel Process, J. Mater. Chem. (2000), 10(8), 1811–1818 (Abstract).*

* cited by examiner

Primary Examiner—Margaret G. Moore
Assistant Examiner—Kuo Liang Peng
(74) Attorney, Agent, or Firm—Heller Ehrman White & McAuliffe LLP

(57) ABSTRACT

The invention relates to transparent organic/inorganic composites with low hydroxyl group content, based on silicic acid heteropolycondensates having extremely low water uptakes. These composites are obtained for example by nonhydrolytic condensation of chlorosilanes with polymerizable groups and optionally fluorinated groups, with the help of a condensation agent (e.g., t-butanol) capable of non-hydrolytic condensation of this chlorosilane, and thermal and/or photochemical polymerization of the obtained condensation product, preferably in the presence of preferably fluorinated organic monomers.

33 Claims, No Drawings

ORGANIC/INORGANIC COMPOSITES WITH LOW HYDROXYL GROUP CONTENT, METHOD FOR THEIR PRODUCTION AND APPLICATION

The present invention relates to preferably transparent organic/inorganic composites with low hydroxyl group content, methods for their production and their application.

The present invention was based on the problem of developing preferably transparent composite materials based on silica heteropolycondensates which materials show an as low as possible takeup of water.

It is known that if such silica heteropolycondensates are prepared by the conventionally employed sol-gel process, they show a non-negligible content of OH groups which is due to the hydrolysis and condensation of the employed starting materials (silanes, etc.). Various ways of reducing said hydroxyl group content in such polycondensates have been proposed in the literature, e.g., by reacting said polycondensates with compounds which are reactive with water and OH groups. Typical examples thereof are the reaction with halides of the fourth main and sub groups of the Periodic Table ($SiCl_4$, $TiCl_4$, etc.) or with chlorine (e.g., in attempts to produce waveguide fibers based on $SiO_2$ having a low content of OH groups). In the cases described it is, however, usually not possible to lower the content of OH groups down to the ppb range.

Another proposed way is to keep the prepared silica heteropolycondensates from containing major amounts of water and SiOH groups from the beginning. This applies, e.g., to the reaction of alkoxysilanes with an excess of acid (see, e.g., Noll, W.: Chemie und Technologie der Silicone, Verlag Chemie, Weinheim, Bergstraβe, 1960, and Voronkov, M. G., Mileshkevich, V. P., Yuzhelevski, Yu. A., The Siloxane Bond, Plenum, New York, London, 1978, p. 236). In these reactions reactive intermediate compounds in the sense of alkylsilanes may in part be formed, which intermediate compounds in turn release water by ester cleavage (carboxylic acid esters or esters of mineral acids) during a condensation process, said water being, however, dispersed on a molecular level. Said water dispersed on a molecular level is then reused for hydrolysis and further condensation and is consumed thereby. The gross reaction can be represented by the following equation:

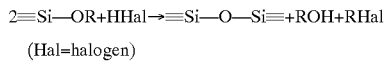

(Hal=halogen)

However, said reactions have usually not been employed for the preparation of extremely anhydrous condensates, but mostly for the homogeneous generation of the water required for the hydrolysis and condensation process (see, e.g., Schmidt, H.-K., Chemistry and Applications of Inorganic-Organic Polymers, Mat. Res. Soc. Symp. Proc., Vol. 73, 1986, p. 741). There, the "anhydrous" reaction path is taken in order to avoid the precipitation of oxides or hydroxides of reactive alkoxides (e.g., titanium alkoxide, aluminum alkoxide) in the presence of slowly reacting esters of silicic acid by direct addition of water. Concentrations of OH groups down to the ppm range are, however, not achievable in this manner.

As low as possible concentrations of OH groups of silica heteropolycondensates are desirable particularly because in combination with inorganic moieties, such as —Si—O—Si or —Si—O—Metal as present in such polycondensates, such OH groups result in a takeup of water which is dependent on the humidity of the air so that the desired goal of ensuring an extremely low water takeup cannot be achieved.

It has now surprisingly been found that the above problem can be solved by the combination of, i.a., the "anhydrous" reaction paths mentioned above and the increase in hydrophobicity of the network by the synthesis of inorganic/organic composite materials with a silica heteropolycondensate as network. Here, a silica network is first synthesized via the reaction principle described above. This may, e.g., be represented by the following general equations:

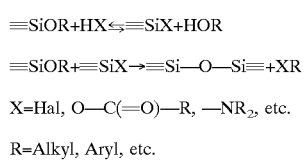

At least a part of the silanes employed for the above network synthesis has groups capable of forming organic polymer chains, e.g., (meth)acrylic or vinylic groups.

In order to increase the hydrophobicity of the network, additional silanes having hydrophobizing groups may be employed, e.g., those having (per)fluorinated side chains (particularly (per)fluorinated alkyl and aryl groups).

A further optional component are (per)fluorinated polymerizable organic monomers which can undergo a polymerization reaction with the polymerizable side chains of the above silanes. This is appropriate especially in cases where no silanes having (per)fluorinated side chains and groups, respectively have been employed for the synthesis of the silica network, as a certain content of fluorine of the composites according to the present invention is highly desirable.

As further optional component for the preparation of the composites with low hydroxyl group content according to the present invention nanoparticles having a low OH group content may also be employed, which particles are also available in accordance with the present invention.

Specifically, the present invention provides a process for the preparation of organic/inorganic composites lean in hydroxyl groups, which process comprises (1) the non-hydrolytic condensation of one or more silanes, at least a part whereof has a group featuring at least one polymerizable carbon—carbon double or triple bond, which group is bonded to Si via an Si—C bond, the remaining groups on the Si atoms of the silanes which are not capable of undergoing condensation being preferably selected from saturated aliphatic and aromatic hydrocarbon groups which may optionally be substituted (preferably with halogen atoms such as F and Cl); and (2) the thermal and/or photochemical polymerization of the condensation products of step (1).

Preferred embodiments of said process will be explained below.

According to a preferred embodiment the above process comprises (a) the non-hydrolytic condensation of at least one chlorosilane of the general formula (1)

$$R^1{}_a R^2{}_b Si(Cl)_c \qquad (1)$$

wherein $R^1$ is a group having at least one polymerizable carbon—carbon double or triple bond (preferably double bond) and is linked to Si via an Si—C bond, $R^2$ is an optionally substituted, saturated aliphatic or aromatic hydrocarbon group, a=1 or 2,
b=0 or 1,
c=2 or 3,
wherein (a+b+c)=4;
optionally in combination with
   (i) at least one chlorosilane of the general formula (2)

    (2)

wherein
R$^1$ and R$^2$ are as defined above,
d=0 or 3,
e=0, 1, 2 or 3,
f=1, 2 or 3,
wherein (d+e+f)=4 and for d=3 or e=2 or 3 the groups R$^1$ and R$^2$, respectively may be the same or different;
and/or
   (ii) at least one compound selected from the group consisting of tetrachlorides and tetrabromides of Ge, Si, Ti and Zr and AlCl$_3$ and AlBr$_3$;
   by means of a condensing agent which is capable of non-hydrolytically condensing the above halogen compounds; or
(a') the condensation of at least one alkoxysilane of the general formula (3)

    (3)

wherein
R$^1$, R$^2$, a, b and c are as defined above and R represents alkyl (preferably having 1 to 4 carbon atoms such as methyl, ethyl, n- and i-propyl, preferably methyl or ethyl); optionally in combination with
   (i') at least one alkoxysilane of the general formula (4)

    (4)

wherein
R$^1$, R$^2$, R, d, e and f are as defined above; and/or
   (ii') at least one compound of the general formula (5)

    (5)

wherein
R is as defined above,
M=Ge, Si, Ti, Zr or Al,
g=3 for M=Al and g=4 in all other cases;
by means of an anhydrous acid (e.g., a mineral acid such as HCl, HBr and HI or an organic acid such as formic acid, acetic acid, trifluoroacetic acid, etc.);
   (b) the thermal and/or photochemical polymerization of the condensation product of step (a) or (a').

Organic/inorganic composites and the condensation product precursors for said composites obtainable according to said process are also an object of the present invention.

In the process according to the present invention mixtures of chlorosilanes and alkoxysilanes can, of course, also be condensed without the addition of water. Corresponding processes are also known to the skilled person.

A preferred condensing agent for the non-hydrolytic condensation according to the above alternative (a) of the process according to the present invention is t-butanol (2-methyl-2-propanol). Examples of other suitable non-hydrolytic condensing agents are benzyl alcohol, benzaldehyde, tetrabenzoxysilane, diisopropylether, diethylether, dibenzylether and trifluoroacetic acid.

In the case of the above alternative (a) with t-butanol as condensing agent one may proceed, e.g., as follows:

The corresponding chlorosilanes (of general formula (1) and optionally of general formula (2)) as well as the remaining compounds optionally employable according to alternative (a) are reacted with t-butanol in a molar ratio of condensing agent to number of reactive chloro and bromo atoms of about 0.5:1, which leads to the liberation of HCl and HBr, respectively. The reaction is usually carried out at elevated temperatures, preferably at about 50 to 80° C. The formed t-butoxysilane functional groups then react, with condensation, with a further halosilane functionality, whereby a siloxane bond is formed and t-butylhalide is released. The reaction usually takes about 3 to 24 hours. After the readily volatile components have been distilled off, a further reaction with the same amount of condensing agent is carried out. After a further distillation, an ormocer sol lean in OH groups is obtained. As an alternative to t-butanol, other condensing agents may be employed as well, e.g., those already mentioned above.

A further reduction in the content of OH groups of the sol may be achieved by refluxing said sol with an excess of a trialkylchlorosilane. Said trialkylchlorosilane may, for example, be trimethylchlorosilane, trivinylchlorosilane or triethylchlorosilane. The molar ratio of monochlorosilane to condensed silane monomers preferably ranges between 1:10 and 1:5. The reaction is effected by heating under reflux, the reaction times being in the range of a few hours. Subsequently, the readily volatile components are removed in vacuo. The post-treatment just described is usually not necessary if only dichlorosilanes are employed but may be of advantage if trichlorosilanes are (co)employed.

In order to make possible, without the addition of solvents, an easy processability of the sols thus obtainable, e.g., for a structuring by embossing or for reactive casting, it is necessary to deliberately adjust the viscosity of the sols. This may, e.g., be done by suitably adjusting the relative ratios of the compounds having two, three and four, respectively reactive halogen atoms. The higher the proportion of compounds having only two halogen atoms per molecule the lower the viscosity of the resulting sols, while with an increasing proportion of compounds having three or even four reactive halogen atoms the viscosity of the sols increases. Thus, the viscosity of the sols may be tailored by suitable choice of halogen starting compounds.

If desired, fluorinated organic monomers and/or oxidic nanoparticles lean in OH groups may be added to the sol prior to its further processing, as will be described further below.

Preferably, the proportion of silanes of the above general formula (1) and/or (3) with respect to the total of condensable compounds present is at least 2 mole %, particularly at least 5 mole % and particularly preferred at least 10 mole % in all of the above alternatives of the process according to the present invention. The corresponding upper limit is preferably 75 mole %, more preferred 50 mole % and particularly preferred 35 mole %.

The groups R$^1$ in the above general formulae (1) to (4) are preferably those of formula H$_2$C=CR$^3$CO—O—(CH$_2$)$_n$—CH$_2$—, wherein R$^3$ is H, CH$_3$, F or Cl, preferably H and CH$_3$, and n=1–5, preferably 1 or 2 and particularly preferred 2, and/or allyl or vinyl groups.

The groups R$^2$ in the above general formulae (1) to (4) preferably are (particularly unsubstituted) alkyl groups, preferably those having 1 to 6 carbon atoms (e.g., methyl, ethyl, propyl and butyl), and/or fluoroalkyl groups, particularly those having 2 to 14 carbon atoms and at least 3, particularly at least 4 and particularly preferred at least 5 fluorine atoms. Examples of such fluoroalkyl groups are tridecafluoro-1,1,2,2-tetrahydrooctyl and heptadecafluoro-1,1,2,2-tetrahydrodecyl. As other preferred fluorinated groups $R^2$ fluorinated aromatic groups such as pentafluorophenyl may be mentioned. In general, fluorine containing groups having an as high as possible content of fluorine are preferred for the purposes of the present invention.

Preferred compounds of the general formula (1) or (3) are those wherein a=1, whereas in preferred compounds of the general formula (2) or (4) d=0, e=0, 1 or 2 (particularly 1 or 2) and f=2 or 3.

The preparation of the polycondensate according to the above alternatives (a) and (a') is followed by a polymerization of the polymerizable double (or triple) bonds contained in said polycondensates and derived from the groups $R^1$ in order to (thermally or photochemically) cure said polycondensates. For said purpose a thermal initiator and/or a photoinitiator may be added to the polycondensate. Particularly in the photochemical polymerization, the addition of a photoinitiator is preferred. As photoinitiators the commercially available photoinitiators may, e.g, be used. Examples thereof are Irgacure® 184 (1-hydroxycyclohexyl phenyl ketone), Irgacure® 500 (1-hydroxycyclohexyl phenyl ketone, benzophenone), lrgacure® 369 and other photoinitiators of the Irgacure® type available from the company Ciba-Geigy; Darocur® 1173, 1116, 1398, 1174 and 1020 (available from the company Merck), benzophenone, chlorothioxanthone, 2-methylthioxanthone, 2-isopropylthioxanthone, benzoin, 4,4'-dimethoxybenzoin, benzoinethylether, benzoinisopropylether, benzildimethylketale, 1,1,1-trichloroacetophenone, diethoxyacetophenone and dibenzosuberone.

In the case of the employment of a thermal initiator the conventional initiators known in the art may also be used. Examples thereof are, i.a., organic peroxides in the form of diacyl peroxides, peroxy dicarbonates, alkyl peresters, dialkyl peroxides, perketales, ketone peroxides, alkyl and aryl peroxides and alkyl hydroperoxides as well as azo compounds. Specific examples for such thermal initiators are dibenzoyl peroxide, dilauroyl peroxide, tert-butyl perbenzoate and azobisisobutyronitrile. Persulfates may also be mentioned in this context.

In the thermal polymerization the polymerization temperature is primarily dependent on the decomposition temperature of the thermal initiator but is preferably not higher than 135° C. and particularly not higher than 110° C.

The concentration of photo and/or thermal initiator is usually 0.05–15 mole %, preferably 0.1–9 mole % and particularly preferred 0.5–5 mole %, based on the polymerizable bonds.

Finally it is to be noted that thermal and photochemical polymerization may also be combined, e.g., by carrying out a thermal post-treatment after the photochemical polymerization.

According to a preferred embodiment of the process according to the present invention the polymerization of the above step (2) and (b), respectively is carried out in the form of a copolymerization of the polycondensate of step (1) and (a) or (a'), respectively with at least one organic compound which is free of any element different from C, H, D, O, N and halogen and has a single polymerizable carbon—carbon double or triple bond (preferably double bond). Examples of such organic compounds are the conventional radically polymerizable monomers as they are used, e.g., for the production of plastics.

Especially if the polycondensate has been prepared without using starting materials having fluorine containing groups, it is preferred that at least a part of the organic polymerizable compound(s) contains fluorine. In that case, particularly preferred organic compounds contain at least 3, particularly at least 4 and particularly preferred at least 5 fluorine atoms in their molecules. Among said compounds those containing a preferably aliphatic group having at least 2 carbon atoms and at least 4 fluorine atoms are particularly preferred. (Per)fluorinated aromatic groups such as, e.g., pentafluorophenyl may also be employed advantageously for said purpose.

Fluorinated organic compounds for the copolymerization with said polycondensate may, e.g., be selected from totally or partially fluorinated styrene (or derivatives thereof, totally or partially fluorinated esters of monounsaturated mono- and polycarboxylic acids, fluorinated allyl compounds and fluorinated vinyl compounds and mixtures thereof. Specific examples for said compounds will be mentioned further below.

It is, of course, also possible to employ crosslinking agents in the polymerization of step (2) and (b), respectively, which may be desirable particularly in cases where the silanes of the above formulae (1) to (4) did not comprise any silane wherein the value of a and d, respectively exceeded 1. Examples of suitable crosslinking agents are the conventional (optionally fluorinated) organic compounds having at least two polymerizable carbon—carbon double and/or triple bonds as well as corresponding crosslinking agents having silane functionality. Specific examples for such cross-linking agents will be given further below.

As already mentioned, the organic/inorganic composites according to the present invention may contain oxidic nanoparticles having a low content of OH groups as further optional component. In the present case the term "nanoparticles" is to denote particles having an average particle size of not more than 100 nm, preferably not more than 50 nm and particularly not more than 20 nm. Although there is no lower limit to said particle size, said lower limit of the average particle size usually is at 1 nm.

The present invention also provides a process for the preparation of such oxidic nanoparticles having a low content of OH groups. The process particularly comprises the reaction of at least one chloride, bromide or iodide of Ge, Sn, Si, Ti, Zr, Hf, Al, Zn, Nb or Ta (preferably of Si), and a condensing agent capable of non-hydrolytically condensing said halides (the compounds already mentioned above for alternative (a) of the process for the preparation of composites according to the present invention being suitable as such condensing agents) in an (aprotic) solvent inert to the reactants and products and, optionally, the subsequent reaction of the formed nanoparticles with a surface modifier capable of replacing the radicals present on the surfaces of said nanoparticles and derived from said condensing agent by radicals having groups with polymerizable bonds and/or alkyl groups.

Preferably, the molar ratio of halogen atoms in the compound to be condensed to condensing agent is 1:1 to 1:50, particularly 1:2 to 1:30.

Examples of suitable inert solvents are, e.g., hydrocarbons which may optionally have halogen (particularly chlorine) substituents. Particularly preferred hydrocarbons are aliphatic hydrocarbons, specific examples for particularly preferred solvents being methylene chloride and chloroform.

Preferably, the condensation is carried out at elevated temperature, the upper limit of the temperature being usually the boiling point of the solvent or the condensing agent (depending on which of said two has the lower boiling point). Conventional temperatures range between about 40 and 70° C. In that case the reaction is preferably terminated by cooling the reaction mixture (e.g. to 0° C.). Thereafter, the volatile components may be removed (e.g. in vacuo). Also, the condensation reaction is suitably carried out in the presence of a catalyst, e.g., a Lewis acid such as iron chloride.

In a preferred embodiment of the above process the oxidic nanoparticles thus prepared are subjected to a surface modification in order to convert the radicals derived from the condensing agent on the surfaces of said particles (e.g., t-butyl groups in the case of employing t-butanol) into chemically more stable groups which stabilize said particles. According to a preferred embodiment, for surface modification the particles are treated with an excess of surface modifier which preferably is at least one chlorosilane of the above general formula (1) or (2). The particles thus prepared have a very low content of hydroxyl groups (e.g., content of silanol) and may be recovered by stripping off the solvent and may be redispersed in halogenated solvents and fluorinated monomers. For the surface modification of the particles alkyl chlorosilanes carrying polymerizable groups such as acrylate or methacrylate groups are suitably employed. This makes possible a covalent bonding of particles to the polymeric network of the matrix which may have been made from both the above described polycondensates and the above described fluorinated organic compounds or from a mixture thereof. (Other preferred silane surface modifiers are trialkyl chlorosilanes and trialkenyl chlorosilanes.)

Specific examples of the above surface modifiers are the following chlorosilanes:

(meth)acrylates having silane functionality (the former term, whenever it is used herein, is to include both acrylates as well as methacrylates) such as (meth) acryloxypropyl trichlorosilane, (meth) acryloxypropylmethyl dichlorosilane, (meth) acryloxyethyl trichlorosilane and (meth) acryloxyethylmethyl dichlorosilane as well as the corresponding compounds derived from α-chloro- and α-fluoroacrylic acid;

allyl compounds having silane functionality such as allyl trichlorosilane and allyl dichloromethylsilane;

vinyl compounds having silane functionality such as vinyl trichlorosilane, divinyl dichlorosilane, vinylmethyl dichlorosilane and trivinyl chlorosilane; and simple alkyl chlorosilanes such as trimethyl chlorosilane, triethyl chlorosilane, dimethyl dichlorosilane and methyl trichlorosilane.

Particularly preferred organic/inorganic composites lean in hydroxyl groups according to the present invention which show a low takeup of water are prepared from the following starting materials (without condensing agent and initiator):

(A) 4 to 75, preferably 5 to 50, particularly preferred 5 to 35 mole % of silanes having a polymerizable multiple bond; preferred examples of such silanes are silanes derived from methacrylic acid, acrylic acid, α-chloroacrylic acid and α-fluoroacrylic acid as well as allyl and vinyl silanes. Specific (meth)acrylates having silane functionality are, for example, (meth) acryloxypropyl trichlorosilane, (meth) acryloxypropylmethyl dichlorosilane, (meth) acryloxyethyl trichlorosilane, (meth) acryloxyethylmethyl dichlorosilane as well as the corresponding compounds derived from α-chloroacrylic acid and α-fluoroacrylic acid. In this context it may also be noted that instead, of the chlorosilanes the corresponding alkoxysilanes, particularly the methoxy and ethoxy compounds, may be employed as well (the same applies in the following). Specific allyl compounds having silane functionality are, e.g., allyl trichlorosilane and allyl dichloromethylsilane, whereas as specific examples for vinyl compounds having silane functionality vinyl trichlorosilane, divinyl dichlorosilane, vinylmethyl dichlorosilane and trivinyl chlorosilane may be mentioned.

Finally it is to be mentioned that silanes having several polymerizable multiple bonds may be employed as crosslinkers as well. Specific examples thereof are 1,3-bis(3-methacryloxypropyl)tetrakis (trimethylsiloxy)disiloxane and 1,3-bis(3-methacryloxypropyl)tetramethyldisiloxane.

(B) 0 to 85 mole %, preferably 10 to 70 and particularly preferred 15 to 65 mole % of silanes having fluorinated groups; specific examples of such silanes are (tridecafluoro-1,1,2,2-tetrahydrooctyl)methyl dichlorosilane, (tridecafluoro-1,1,2,2-tetrahydrooctyl) trichlorosilane, (heptadecafluoro-1,1,2,2-tetrahydrodecyl)methyl dichlorosilane, (heptadecafluoro-1,1,2,2-tetrahydrodecyl) trichlorosilane, pentafluorophenyl trichlorosilane, pentafluorophenylmethyl dichlorosilane and pentafluorophenylethyl dichlorosilane.

(C) 0 to 95, preferably 20 to 90 and particularly preferred 70 to 80 mole % of fluorinated organic polymerizable compounds as defined above. Specific examples of such compounds are fluorinated styrenes such as pentafluorostyrene; fluorinated aromatic, cycloaliphatic or aliphatic (meth)acrylates such as pentafluorophenyl (meth)acrylate, pentafluorobenzyl(meth)acrylate, perfluorocyclohexyl(meth)acrylate, tetrafluoropropyl (meth)acrylate, hexafluorobutyl(meth)acrylate, octafluoropentyl(meth)acrylate, dodecafluoroheptyl (meth)acrylate, perfluoroctyl(meth)acrylate, heptadecafluorodecyl(meth)acrylate, trihydroperfluoroundecyl(meth)acrylate as well as the corresponding compounds derived from α-fluoroacrylic acid and α-chloroacrylic acid;

polymerizable fluorinated derivatives of maleic acid and itaconic acid such as bis-hexafluoroisopropyl itaconate, bis-hexafluoroisopropyl maleate, bis-perfluorooctyl itaconate, bis-perfluorooctyl maleate, bis-trifluoroethyl itaconate and bis-trifluoroethyl maleate;

fluorinated allyl compounds such as allylheptafluorobutyrate, allylheptafluoroisopropylether, allyl-1H,1H-pentadecafluorooctylether, allylpentafluorobenzene, allylperfluoroheptanoate, allylperfluorooctanoate, allylperfluorononanoate and allyltetrafluoroethylether;

fluorinated vinyl compounds such as vinylheptafluorobutyrate, vinylperfluoroheptanoate, vinylperfluorononanoate and vinylperfluorooctanoate.

As fluorinated crosslinkers the following specific examples may be cited:
2,2,3,3-tetrafluoro-1,4-butanediol di(meth)acrylate, 1,1,5,5-tetrahydroperfluoropentyl-1,5-di(meth) acrylate, hexafluorobisphenol-A-di(meth)acrylate and octafluorohexanediol-1,6-di(meth)acrylate.

The starting materials (B) and (C) together preferably account for 25 to 96, more preferred 50 to 95 and particularly preferred 65 to 95 mole %.

(D) 0 to 20, preferably 2 to 15 and particularly preferred 3 to 10 mole % of fluorine-free organic crosslinking agent. Examples of fluorine-free crosslinking agents are bisphenol-A-bis(meth)acrylate, trimethylolpropanetri(meth)acrylate and neopentylglycoldi(meth)acrylate.

(E) 0 to 14, preferably 1 to 10 and particularly preferred 2 to 4 mole % of polymerizable monomers containing aromatic groups optionally substituted with deuterium and/or halogen such as styrene, styrene-d8, chlorostyrene, dichlorostyrene, bromostyrene and dibromostyrene.

(F) 0 to 40% by vol., preferably 5 to 30% by vol., of oxidic nanoparticles lean in hydroxyl groups as described above.

(G) up to 30, preferably up to 20 and particularly preferred 1 to 5 mole % of simple halogenated silanes such as trimethyl chlorosilane, dimethyl dichlorosilane, methyl trichlorosilane, tetrachlorosilane, tetrabromosilane and/or halides or optionally alkoxides of the elements Ge, Sn, Ti, Zr, Hf, Al, Nb, Ta, Zn or mixtures of the compounds mentioned above.

In order to prepare the composites according to the present invention the components (A) and (B) in the form of their alkoxides in an alcohol which is preferably ethanol may, e.g., be reacted with the addition of an anhydrous acid, or the components (A) and (B) may be reacted in the form of their chlorosilanes with a suitable condensing agent. In the reaction of the alkoxides with acid, anhydrous HCl, HBr, HI, acetic acid, formic acid or trifluoroacetic acid may, for example, be employed. The reaction is preferably carried out by heating under reflux. Following the stripping of the solvent and of the readily volatile components in vacuo the obtained sol may be further processed. Particularly preferred is the condensation starting from the components (A) and (B) in the form of the trichlorosilanes and the corresponding dichloromethylsilanes, wherein the silanes having polymerizable all groups may be methacrylic, acrylic, α-chloroacrylic, α-fluoroacrylic, allylic or vinylic compounds. Particularly preferred are those compounds which have a (meth)acrylic functionality, particularly the methacrylates. Among the optionally added silanes having (per)fluorinated side chains those having a high fluorine content are preferably employed, particularly (heptadecafluoro-1,1,2,2-tetrahydrodecyl)methyl dichlorosilane, (heptadecafluoro-1,1,2,2-tetrahydrodecyl) trichlorosilane, pentafluorophenyl trichlorosilane, pentafluorophenylmethyl dichlorosilane and pentafluorophenylethyl dichlorosilane.

Preferably, the above components (D), (E) and (F) are added to the sol subsequent to the preparation thereof as described above, while the above components (G) are usually coemployed in the preparation of the sol.

The initiators are usually added only shortly before the polymerization. Since (meth)acrylate groups are present, Irgacure® 184 is preferably employed, preferably in amounts of 0.1 to 5 mole %, based on the polymerizable double bonds.

For the preparation of molded bodies from the above described composites, the sols to which a photoinitiator has been added are, for example, cured in an UV transparent mold beneath a UV conveyor belt equipment or beneath a UV lamp. Optionally, a thermal initiator is added prior to the polymerization and a thermal post-curing is conducted.

For the preparation of layers of the above composites, the sols to which photoinitiator may have been added may be applied onto substrates by dip coating, spin coating or roller coating. For said purpose said sols may also be pressed between two plane substrates. Examples of suitable substrates are those of glass, silicon, ceramics and polymers. The curing is carried out, for example, as described in the case of the manufacture of molded bodies. If the curing is effected photochemically a thermal initiator may additionally be added prior to the polymerization, and a thermal post-curing may be conducted.

The composites according to the present invention may preferably be employed in the production of layers, monoliths, adhesives or sealants. The layers and monoliths are preferably characterized in that they show a low attenuation in the near infrared (NIR) at 1.3 μm and 1.55 μm.

The following examples serve to further illustrate the present invention.

EXAMPLE 1

Synthesis of an Ormocer System Starting from an Organo-functionalized Trichlorosilane Methacryloxypropyl trichlorosilane (39.24 g, 0.15 moles) is heated to 65° C. with stirring under inert gas. For 30 minutes, 16.68 g (0.225 moles) of 2-methyl-2-propanol are added thereto in a dropwise fashion; the generated hydrogen chloride gas is allowed to escape from the reaction flask via a bubble counter filled with silicone oil. The reaction mixture is stirred for another 3 hours at the same temperature. Then, a further 16.68 g (0.225 moles) portion of 2-methyl-2-propanol is added and stirring at 65° C. is continued for one hour. After cooling to room temperature, excess 2-methyl-2-propanol as well as formed 2-methyl-2-chloropropanol are distilled off at 0.5 mbar for 3 hours. In the IR spectrum (FT-IR spectrometer IFS 66v, Bruker, with evacuatable measuring cell, measured between two KBr windows) only a very weak band in the wavenumber range of 3600 to 3300 cm$^{-1}$, due to the remaining OH groups, can still be detected.

Subsequently, about 8 ml of trimethyl chlorosilane are added, and the reaction mixture is kept under mild reflux for one hour under protective gas. After cooling to room temperature the readily volatile components are again distilled off at 0.5 mbar. Further condensation reactions during the treatment with trimethyl chlorosilane may be detected by means of $^{29}$Si-NMR spectroscopy by an increase of the signals of the T$^2$ (−53 to −62 ppm) and T$^3$ groups (−64 to −72 ppm) and the disappearance of the T$^1$ signals (−47 to −51 ppm). A decrease of the IR band in the range of 3600 to 3300 cm$^{-1}$ additionally indicates a further reduction of the OH group content. The finished sol may be further processed immediately.

EXAMPLE 2

Synthesis of an Anhydrous Ormocer System Starting from an Organo-functionalized Dichlorosilane Methacryloxypropylmethyl dichlorosilane (36.18 g, 0.15 moles) is heated to 65° C. with stirring under inert gas. 2-Methyl-2-propanol (11.12 g, 0.15 moles) is added thereto over a period of 30 minutes in a dropwise fashion; the formed hydrogen chloride gas is allowed to escape from the reaction flask via a bubble counter filled with silicone oil. Stirring of the reaction mixture is continued for 24 hours at the same temperature. Subsequently, further 11.12 g (0.15 moles) of 2-methyl-2-propanol are added and stirring at 65° C. is continued for 2 hours. After cooling to room temperature, excess 2-methyl-2-propanol as well as formed 2-methyl-2-chloropropanol are distilled off at 0.5 mbar. A post-silanization with trimethyl chlorosilane is not necessary since only doubly bonded siloxanes can be detected by means of $^{29}$Si-NMR spectroscopy.

EXAMPLE 3

Synthesis of a Fluoro-functionalized Ormocer Sol by Co-condensation of Organo-functionalized and Fluoroalkyl-functionalized Dichlorosilanes Methacryloxypropylmethyl dichlorosilane (12.06 g, 0.05 moles) and 1H,1H,2H,2H-tridecafluorooctylmethyl dichlorosilane (46.11 g, 0.1 mole) are heated to 65° C. with stirring under inert gas. 2-Methyl-2-propanol (11.12 g, 0.15 moles) is added thereto over a period of 30 minutes in a dropwise fashion; the formed hydrogen chloride gas is allowed to escape from the reaction flask via a bubble counter filled with silicone oil. Stirring of the reaction mixture is continued for 24 hours at the same temperature. Subsequently, further 14.82 g (0.2 moles) of 2-methyl-2-propanol are added and stirring at 65° C. is continued for two hours. After cooling to room temperature, excess 2-methyl-2-propanol as well as formed 2-methyl-2-chloropropanol are distilled off at 0.5 mbar. The presence of cocondensates can be confirmed by means of $^{29}$Si-NMR spectroscopy by the strongly broadened $D^2$ band at −16 to −24 ppm as compared to the spectra from Example 1. A post-silanization with trimethyl chlorosilane is not necessary since the amount of singly bonded siloxane groups, as determined by $^{29}$Si-NMR spectroscopy, is below 3%.

EXAMPLE 4

Synthesis of a Fluoro-functionalized Ormocer Sol by Co-condensation of Organo-functionalized Dichlorosilanes and Fluoroalkyl-functionalized Trichlorosilanes Methacryloxypropylmethyl dichlorosilane (12.06 g, 0.05 moles) and 1H,1H,2H,2H-tridecafluorooctyl trichlorosilane (24.08 g, 0.05 moles) are heated to 65° C. with stirring under inert gas. 2-Methyl-2-propanol (9.27 g, 0.125 moles) is added thereto over a period of 30 minutes in a dropwise fashion; the formed hydrogen chloride gas is allowed to escape from the reaction flask via a bubble counter filled with silicone oil. Stirring of the reaction mixture is continued for 24 hours at the same temperature. Subsequently, further 9.27 g (0.125 moles) of 2-methyl-2-propanol are added and stirring at 65° C. is continued for two hours. After cooling to room temperature, the excess 2-methyl-2-propanol as well as formed 2-methyl-2-chloropropanol are distilled off at 0.5 mbar. The presence of cocondensates can be confirmed, by means of $^{29}$Si-NMR spectroscopy, by the strongly broadened $D^2$ band at −16 to −24 ppm as compared to the spectra from Example 1.

EXAMPLE 5

Photopolymerization of an Ormocer System Free of Fluorine and Lean in OH Groups

Irgacure® 184 (50 mg) is added to 5 g of the sol prepared in Example 1 from methacryloxypropyl trichlorosilane in a light-protected flask under stirring. The mixture is then placed in a UV transparent cylindrical mold and is cured in a UV conveyor belt equipment (Beltron®) within 10 cycles at a rate of 2.5 m/min over a distance of 0.6 m at a total energy density of 2.5 J/cm² per cycle (measured in the wavelength range of 280 to 320 nm), a strong heating of the sample being indicative of the photopolymerization.

The molded body thus obtained is then plane-parallelly polished by means of permanent oil-based diamond suspensions (Metadi®, Wirtz Buehler) with decreasing particle diameters (9, 3 and 1 μm). By means of NIR spectroscopy (NIR-UV/VIS spectrometer Omega 20, Bruins Instruments) optical attenuation values of 1.0 to 1.2 dB/cm at 1550 nm and ≦0.2 dB/cm at 1300 nm are measured. The use of aqueous $Al_2O_3$ suspensions of corresponding particle sizes in the polishing operation does not result in a decrease of the attenuation values.

EXAMPLE 6

Photopolymerizafion of a Fluorine Containing Ormocer System Lean in OH Groups

Irgacure® 184 (50 mg) is added to 5 g of the sol prepared in Example 3 by cocondensation of methacryloxypropylmethyl dichlorosilane with 1H,1H,2H,2H-tridecafluorooctylmethyl dichlorosilane in a light-protected flask and dissolved with stirring. The mixture is then placed in a UV transparent cylindrical mold and is cured in a UV conveyor belt equipment (Beltron®) within 10 cycles at a rate of 2.5 m/min over a distance of 0.6 m at a total energy density of 2.5 J/cm² per cycle (measured in the wavelength range of 280 to 320 nm), a strong heating of the sample being indicative of the photopolymerization.

The molded body thus obtained is then plane-parallelly polished by means of permanent oil-based diamond suspensions (Metadi®, Wirtz Buehler) with decreasing particle diameters (9, 3 and 1 μm). By means of NIR spectroscopy (NIR-UV/VIS Spectrometer Omega 20, Bruins Instruments) optical attenuation values of 0.7 to 0.8 dB/cm at 1550 nm and ≦0.2 dB/cm at 1300 nm are measured. The use of aqueous $Al_2O_3$ suspensions of corresponding particle sizes in the polishing operation does not result in a decrease of the attenuation values.

EXAMPLE 7

Copolymerization of a Fluorine-free Ormocer System Lean in OH Groups with Fluoroalkylmethacrylates Irgacure® 184 (120 mg) is added to a mixture of 1.2 g of the sol prepared in Example 2 from methacryloxypropylmethyl dichlorosilane with 2.4 g of 1H,1H,5H-octafluoropentylmethacrylate in a light-protected flask and dissolved with stirring. The mixture is then placed in a UV transparent cylindrical mold and is cured in a UV conveyor belt equipment (Beltron®) within 10 cycles at a rate of 2.5 m/min over a distance of 0.6 m at a total energy density of 2.5 J/cm² per cycle (measured in the wavelength range of 280 to 320 nm), a strong heating of the sample being indicative of the photopolymerization.

The molded body thus obtained is then plane-parallelly polished by means of permanent oil-based diamond suspensions (Metadi®, Wirtz Buehler) with decreasing particle diameters (9, 3 and 1 μm). By means of NIR spectroscopy (NIR-UV/VIS Spectrometer Omega 20, Bruins Instruments) optical attenuation values of 0.6 to 0.7 dB/cm at 1550 nm and ≦0.1 dB/cm at 1300 nm are measured. The use of aqueous $Al_2O_3$ suspensions of corresponding particle sizes in the polishing operation does not result in a decrease of the attenuation values.

EXAMPLE 8

Copolymerization of a Fluorine Containing Ormocer System Lean in OH Groups with Fluoroalkylmethacrylates Irgacure® 184 (120 mg) is added to a mixture of 1.2 g of the sol prepared in Example 3 by cocondensation of methacryloxypropylmethyl dichlorosilane and 1H,1H,2H,2H-tridecafluorooctylmethyl dichlorosilane with 1H,1H,2H,2H-heptadecafluoromethylmethacrylate in a light-protected flask and dissolved with stirring. The mixture is then placed in a UV transparent cylindrical mold and is cured in a UV conveyor belt equipment (Beltron®) within 10 cycles at a rate of 2.5 m/min over a distance of 0.6 m at a total energy density of 2.5 J/cm² per cycle (measured in the wavelength range of 280 to 320 nm), a strong heating of the sample being indicative of the photopolymerization.

The molded body thus obtained is then plane-parallelly polished by means of permanent oil-based diamond suspensions (Metadi®, Wirtz Buehler) with decreasing particle diameters (9, 3 and 1 μm). By means of NIR spectroscopy (NIR-UV/VIS Spectrometer Omega 20, Bruins Instruments) optical attenuation values of 0.3 to 0.4 dB/cm at 1550 nm and ≦0.1 dB/cm at 1300 nm are measured. The use of aqueous $Al_2O_3$ suspensions of corresponding particle sizes in the polishing operation does not result in a decrease of the attenuation values.

EXAMPLE 9

$SiO_2$ Nanoparticles from Silicon tetrachloride and t-butanol

A 100 ml Schlenk tube purged with nitrogen for 10 minutes is charged with 50 ml of chloroform and 100 mmoles (9.38 ml) of tert-butanol. The Schlenk tube is heated to 50° C. under reflux. After 10 minutes of heating, 10 mmoles (1.14 ml) of silicon tetrachloride are added to the batch with vigorous stirring and the batch is stirred under reflux for a further 5 minutes. Subsequently, the mixture is cooled to 0° C. by means of an ice bath. The volatile residues in the reaction mixture are removed in vacuo (>3 mbar). Then 5 ml of chloroform and 6 ml of trivinyl chlorosilane are added. Thereafter, the reaction mixture is again brought to a temperature of 50° C. for 2 hours and subsequently stirred at room temperature overnight. The volatile fraction is again stripped in vacuo (>3 mbar). The product is liquid, which is probably due to high boiling by-products, and may be further processed in air. The particle diameters were determined to be 20 nm by transmission electron microscopy. The sol has a refractive index of 1.46637 at 656.3 nm. An attenuation measurement at 1550 nm reveals an optical loss of 0.5 dB/cm (spectrometer Omega 20, Bruins Instruments, 1 cm cuvette, reference: air).

EXAMPLE 10

Preparation of a Monolith from a Composite of $SiO_2$ Nanoparticles in Crosslinked polyoctafluoropentyl methacrylate Octafluoropentyl methacrylate (2.366 g, 8.22 mmoles) is mixed with bisphenol A bismethacrylate (0.333 g, 0.913 mmoles). Subsequently, 0.065 g (2.7% by wt. based on the monomer mixture) of photostarter Irgacure® 184 are added thereto. After complete dissolution of the photoinitiator in the monomer mixture 0.2741 g of $SiO_2$ nanoparticles, prepared according to the protocol of Example 9, are added, and the mixture is transferred into a 2 ml plastic syringe. After the mixture is free of bubbles the sample is subjected to UV curing. An UV irradiation conveyor belt (Beltron) is used for said purpose. For the first four passages an irradiation output of 2 J/cm² (small lamp, full power, 4 m/min) is set. Thereafter, the sample is further treated at an irradiation output of 1 J/cm² (small lamp, half power, 4 m/min) until no heat generation can be detected anymore (a further 10–15 passages).

The molded body thus obtained is then plane-parallelly polished by means of permanent oil-based diamond suspensions (Metadi®, Wirtz Buehler) with decreasing particle diameters (9, 3 and 1 μm). The molded body is transparent and shows an optical loss of 0.4 dB/cm at 1550 nm (spectrometer: Omega 20, Bruins Instruments, reference: air).

What is claimed is:

1. A process for the preparation of an organic/inorganic composite lean in hydroxyl groups, comprising the steps of:
   (1) non-hydrolytically condensing one or more silanes, at least a part of which contain a group comprising at least one polymerizable C—C double or triple bond, where the group is linked to Si by a Si—C bond,
   thereby producing a condensation product; and
   (2) thermally and/or photochemically polymerizing the condensation product;
   wherein at least one of the following is true:
   (a) at least one fluorinated polymerizable organic monomer which can undergo a polymerization reaction with the polymerizable groups of the silanes condensed in step (1) is added to the condensation product prior to step (2), and
   (b) nanoparticles having a low hydroxyl group content are added to the condensation product prior to step (2).

2. A process of claim 1, comprising:
   (1) non-hydrolytically condensing at least one chlorosilane of formula (1)

$$R^1{}_a R^2{}_b Si(Cl)_c \qquad (1)$$

where
   $R^1$ is a group that has at least one polymerizable carbon—carbon double or triple bond and that is linked to the Si by a Si—C bond,
   $R^2$ is an optionally substituted, saturated or aromatic hydrocarbon group,
   a=1 or 2,
   b=0 or 1,
   c=2 or 3, and
   (a+b+c)=4;
   optionally in combination with
      (i) at least one chlorosilane of formula (2)

$$R^1{}_d R^2{}_e Si(Cl)_f \qquad (2)$$

where
      $R^1$ and $R^2$ are as defined above,
      d=0 or 3,
      e=0, 1, 2 or 3,
      f=1, 2 or 3, and
      (d+e+f)=4, and
      where d=3 or e=2 or 3 the groups $R^1$ and $R^2$, respectively, may be the same or different;
      and/or
      (ii) at least one compound selected from the group consisting of $GeCl_4$, $GeBr_4$, $SiCl_4$, $SiBr_4$, $TiCl_4$, $TiBr_4$, $ZrCl_4$, $ZrBr_4$, $AlCl_3$, and $AlBr_3$;
   with a condensing agent capable of non-hydrolytically condensing the above compounds; or
   (1') condensing at least one alkoxysilane of formula (3)

$$R^1{}_a R^2{}_b Si(OR)_c \qquad (3)$$

where
   $R^1$, $R^2$, a, b and c are as defined above; and

R is alkyl;
optionally in combination with
(i) at least one alkoxysilane of formula (4)

$$R^1_d R^2_e Si(OR)_f \quad (4)$$

where
R$^1$, R$^2$, R, d, e and f are as defined above; and/or
(ii) at least one compound selected from the group consisting of Ge(OR)$_4$, Si(OR)$_4$, Ti(OR)$_4$, Zr(OR)$_4$, and Al(OR)$_3$, where R is as defined above;
with an anhydrous acid; or
(1") non-hydrolytically condensing at least one chlorosilane of formula (1)

$$R^1_a R^2_b Si(Cl)_c \quad (1)$$

where
R$^1$, R$^2$, a, b, and c are as defined above,
optionally in combination with
(i) at least one chlorosilane of formula (2)

$$R^1_d R^2_e Si(Cl)_f \quad (2)$$

where
d, e, and f are as defined above; and/or
(ii) at least one compound selected from the group consisting of GeCl$_4$, GeBr$_4$, SiCl$_4$, SiBr$_4$, TiCl$_4$, TiBr$_4$, ZrCl$_4$, ZrBr$_4$, AlCl$_3$, and AlBr$_3$;
with at least one alkoxysilane of formula (3)

$$R^1_a R^2_b Si(OR)_c \quad (3)$$

where
R$^1$, R$^2$, a, b, c, and R are as defined above;
optionally in combination with
(i) at least one alkoxysilane of formula (4)

$$R^1_d R^2_e Si(OR)_f \quad (4)$$

where
R$^1$, R$^2$, R, d, e and f are as defined above; and/or
(ii) at least one compound selected from the group consisting of Ge(OR)$_4$, Si(OR)$_4$, Ti(OR)$_4$, Zr(OR)$_4$, and Al(OR)$_3$, where R is as defined above;
thereby producing a condensation product; and
(2) thermally and/or photochemically polymerizing the condensation product of step (1), (1'), or (1").

3. A process of claim 2 where the condensing agent in step (1) is selected from the group consisting of t-butanol, benzyl alcohol, benzaldehyde, tetrabenzoxysilane, diisopropylether, diethylether, dibenzylether and trifluoroacetic acid.

4. A process of claim 2 where the proportion of silanes of formulae (1) and/or (3) to all condensable compounds present ranges from 5 to 100 mole %.

5. A process of claim 2 where R$^1$ comprises: one or more groups of the formula H$_2$C=CR$^3$—CO—O—(CH$_2$)$_n$—CH$_2$—, where R$^3$=H, CH$_3$, F, or Cl, and n=1–5; and/or one or more groups of the formula H$_2$C=CH—(CH$_2$)$_m$—, where m=0 or 1.

6. A process of claim 2 where R$^2$ comprises alkyl groups and/or fluoroalkyl groups having at least 3 fluorine atoms.

7. A process of claim 6 where the alkyl groups are methyl and/or ethyl groups.

8. A process of claim 2 where, in formulae (1) or (3), a=1.

9. A process of claim 2 where, in formulae (2) or (4), d=0 and e=1 or 2.

10. A process of claim 1 where step (2) comprises copolymerizing the condensation product with at least one organic compound that contains only elements selected from C, H, D, O, N, and halogen, and that has a single polymerizable C—C double or triple bond.

11. A process of claim 10 where the at least one organic compound is a fluorinated organic compound having at least 3 fluorine atoms.

12. A process of claim 11 where the fluorinated organic compound is an aliphatic compound having at least 2 carbon atoms or is an aromatic compound having at least 4 fluorine atoms.

13. A process of claim 11 where the fluorinated organic compound is selected from at least partially fluorinated styrene, at least partially fluorinated esters of monounsaturated mono- and polycarboxylic acids, fluorinated allyl compounds, fluorinated vinyl compounds, and mixtures thereof.

14. A process of claim 10 where an optionally fluorinated crosslinking agent and/or a crosslinking agent having silane functionality, having at least 2 polymerizable C—C double or triple bonds, is used in step (2) in addition to or instead of the at least one organic compound.

15. A process of claim 1 where a thermal initiator and/or a photoinitiator is used in step (2).

16. A process of claim 1 where step (2) is photochemical polymerizing, optionally followed by thermally post treating the resulting polymer.

17. A process for the preparation of oxidic nanoparticles lean in hydroxyl groups, comprising:
(1) condensing a condensation mixture comprising
(a) a compound to be condensed which is selected from the group consisting of the chlorides, bromides, and iodides of Ge, Sn, Si, Ti, Zr, Hf, Al, Zn, Nb, and Ca, or a mixture thereof, with
(b) a condensing agent capable of non-hydrolytically condensing said compound to be condensed, and
(c) an inert solvent,
thereby forming the nanoparticles; and optionally
(2) subsequently reacting the nanoparticles with a surface modifier which is capable of replacing the radicals derived from the condensing agent present on the surface of the nanoparticles with radicals containing groups having polymerizable bonds and/or alkyl groups.

18. A process of claim 17 where the compound to be condensed is selected from the group consisting of SiCl$_4$, SiBr$_4$, and SiI$_4$.

19. A process of claim 17 where the condensing agent is selected from the group consisting of t-butanol, benzyl alcohol, benzaldehyde, tetrabenzoxysilane, diisopropylether, diethylether, dibenzylether and trifluoroacetic acid.

20. A process of claim 17 where the molar ratio of condensing agent to halogen atoms in the compound to be condensed is 1:1 to 50:1.

21. A process of claim 17 where the inert solvent comprises an optionally halogenated aliphatic hydrocarbon.

22. A process of claim 21 where the inert solvent is methylene chloride and/or chloroform.

23. A process of claim 17 where step (1) is carried out at an elevated temperature below the boiling point of the condensing agent and the solvent.

24. A process of claim 17 where step (1) is carried out in the presence of a catalyst.

25. A process of claim 17 where, following step (1), the volatile components of the condensation mixture are removed.

26. A process of claim 17 where optional step (2) is performed and the surface modifier is
at least one chlorosilane of general formula (1)

$$R^1{}_a R^2{}_b Si(Cl)_c \qquad (1)$$

where
$R^1$ is a group having at least one polymerizable carbon—carbon double or triple bond and is linked to the Si by an Si—C bond,
$R^2$ is an optionally substituted, saturated or aromatic hydrocarbon group,
a=1 or 2,
b=0 or 1,
c=2 or 3, and (a+b+c)=4;
and/or at least one chlorosilane of general formula (2)

$$R^1{}_d R^2{}_e Si(Cl)_f \qquad (2)$$

where
$R^1$ and $R^2$ are as defined above,
d=0 or 3,
e=0, 1, 2 or 3,
f=1, 2 or 3,
(d+e+f)=4, and
where d=3 or e=2 or 3 the groups $R^1$ and $R^2$, respectively, may be the same or different.

27. Oxidic nanoparticles lean in hydroxyl groups, prepared by the process of claim 17.

28. A process for the preparation of a fluorine-containing organic/inorganic composite lean in hydroxyl groups, comprising
thermally and/or photochemically polymerizing at least one fluorine-containing compound having at least one polymerizable carbon—carbon double or triple bond in the presence of the oxidic nanoparticles of claim 27.

29. A process of claim 28 where the fluorine-containing compound is at least one fluorine-containing condensation product and/or at least one fluorine-containing polymerizable organic compound that contains only elements selected from C, H, D, O, N, and halogen, that has a single polymerizable C—C double or triple bond, and that has at least 3 fluorine atoms.

30. An organic/inorganic composite lean in hydroxyl groups, prepared by the process of claim 1.

31. An organic/inorganic composite lean in hydroxyl groups, prepared by the process of claim 2.

32. A fluorine-containing organic/inorganic composite lean in hydroxyl groups, prepared by the process of claim 28.

33. A fluorine-containing organic/inorganic composite lean in hydroxyl groups, prepared by the process of claim 29.

* * * * *

UNITED STATES PATENT AND TRADEMARK OFFICE
CERTIFICATE OF CORRECTION

PATENT NO. : 6,303,730 B1
DATED : October 16, 2001
INVENTOR(S) : Fries et al.

It is certified that error appears in the above-identified patent and that said Letters Patent is hereby corrected as shown below:

<u>Title page,</u>
Item [22], PCT Filed: Feb. 19, 1998 should read -- [22] PCT Filed: Feb. 18, 1998 --

Signed and Sealed this

Ninth Day of April, 2002

Attest:

*Attesting Officer*

JAMES E. ROGAN
*Director of the United States Patent and Trademark Office*